US011537468B1

(12) United States Patent
Ghosh et al.

(10) Patent No.: US 11,537,468 B1
(45) Date of Patent: Dec. 27, 2022

(54) RECORDING MEMORY ERRORS FOR USE AFTER RESTARTS

(71) Applicant: HEWLETT PACKARD ENTERPRISE DEVELOPMENT LP, Houston, TX (US)

(72) Inventors: Debdipta Ghosh, Karnataka (IN); Renganathan Meenakshisundaram, Karnataka (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/457,679

(22) Filed: Dec. 6, 2021

(51) Int. Cl.
*G06F 11/10* (2006.01)
*G06F 11/07* (2006.01)
*G06F 11/30* (2006.01)
*G06F 11/14* (2006.01)

(52) U.S. Cl.
CPC ........ *G06F 11/1068* (2013.01); *G06F 11/076* (2013.01); *G06F 11/0772* (2013.01); *G06F 11/1441* (2013.01); *G06F 11/3037* (2013.01)

(58) Field of Classification Search
CPC ............. G06F 11/3037; G06F 11/1441; G06F 11/0772; G06F 11/1068; G06F 11/076
See application file for complete search history.

(56) References Cited

U.S. PATENT DOCUMENTS

| 3,638,185 | A | * | 1/1972 | Dell | G06K 17/00 |
| 6,594,785 | B1 | * | 7/2003 | Gilbertson | G06F 11/0712 714/48 |
| 6,898,733 | B2 | * | 5/2005 | Parks | G06F 11/0781 714/15 |
| 7,657,776 | B2 | * | 2/2010 | Rajkumari | G06F 11/0712 714/2 |
| 7,774,562 | B2 | * | 8/2010 | Adkisson | G06F 12/0813 711/144 |
| 8,020,053 | B2 | | 9/2011 | Warnes et al. | |
| 8,719,493 | B2 | | 5/2014 | Berke et al. | |
| 8,869,007 | B2 | | 10/2014 | Cordero et al. | |
| 8,874,979 | B2 | | 10/2014 | Cordero et al. | |
| 8,892,942 | B2 | | 11/2014 | Warnes et al. | |
| 9,519,647 | B2 | * | 12/2016 | Batwara | G06F 16/185 |
| 9,535,782 | B2 | * | 1/2017 | Agrawal | G06F 11/106 |
| 9,613,722 | B2 | | 4/2017 | Huang et al. | |
| 9,697,094 | B2 | | 7/2017 | Das et al. | |
| 9,767,015 | B1 | * | 9/2017 | McKelvie | G06F 12/0238 |
| 9,880,754 | B2 | | 1/2018 | Berke et al. | |
| 2004/0210793 | A1 | * | 10/2004 | Chokshi | G06F 11/0712 714/E11.023 |

(Continued)

*Primary Examiner* — Guy J Lamarre
(74) *Attorney, Agent, or Firm* — Trop, Pruner & Hu, P.C.

(57) ABSTRACT

In some examples, a system records, in a data structure stored in a non-volatile storage, information of memory errors in respective segments of a memory. The system determines whether memory errors of a subset of the segments satisfy a criterion, and in response to determining that the memory errors of the subset of the segments satisfy the criterion, the system groups the memory errors of the subset into a partition having a size greater than a size of a segment. The system records, in the data structure, information of memory errors in the partition, and in response to a restart of the system, retrieves the data structure from the non-volatile storage for use in an operation that addresses memory errors in the system.

20 Claims, 7 Drawing Sheets

(56) References Cited

U.S. PATENT DOCUMENTS

| | | |
|---|---|---|
| 2014/0325315 A1 | 10/2014 | Warnes et al. |
| 2016/0093404 A1 | 3/2016 | Huang et al. |
| 2016/0232063 A1* | 8/2016 | Das .................... G06F 11/1666 |
| 2021/0124655 A1* | 4/2021 | Birnie ................. G06F 11/1471 |
| 2021/0334206 A1* | 10/2021 | Colgrove ............. G06F 3/0638 |

* cited by examiner

RECORDING MEMORY ERRORS FOR USE AFTER RESTARTS

BACKGROUND

Memory devices can exhibit errors during operation. The errors in some cases may be "hard" errors, which are errors caused by a hardware defect in a portion of a memory device. Although memory error detection and correction can be applied to address certain hard errors, other hard errors may not be detectable or correctable using memory error detection or correction techniques.

BRIEF DESCRIPTION OF THE DRAWINGS

Some implementations of the present disclosure are described with respect to the following figures.

Figure 1:
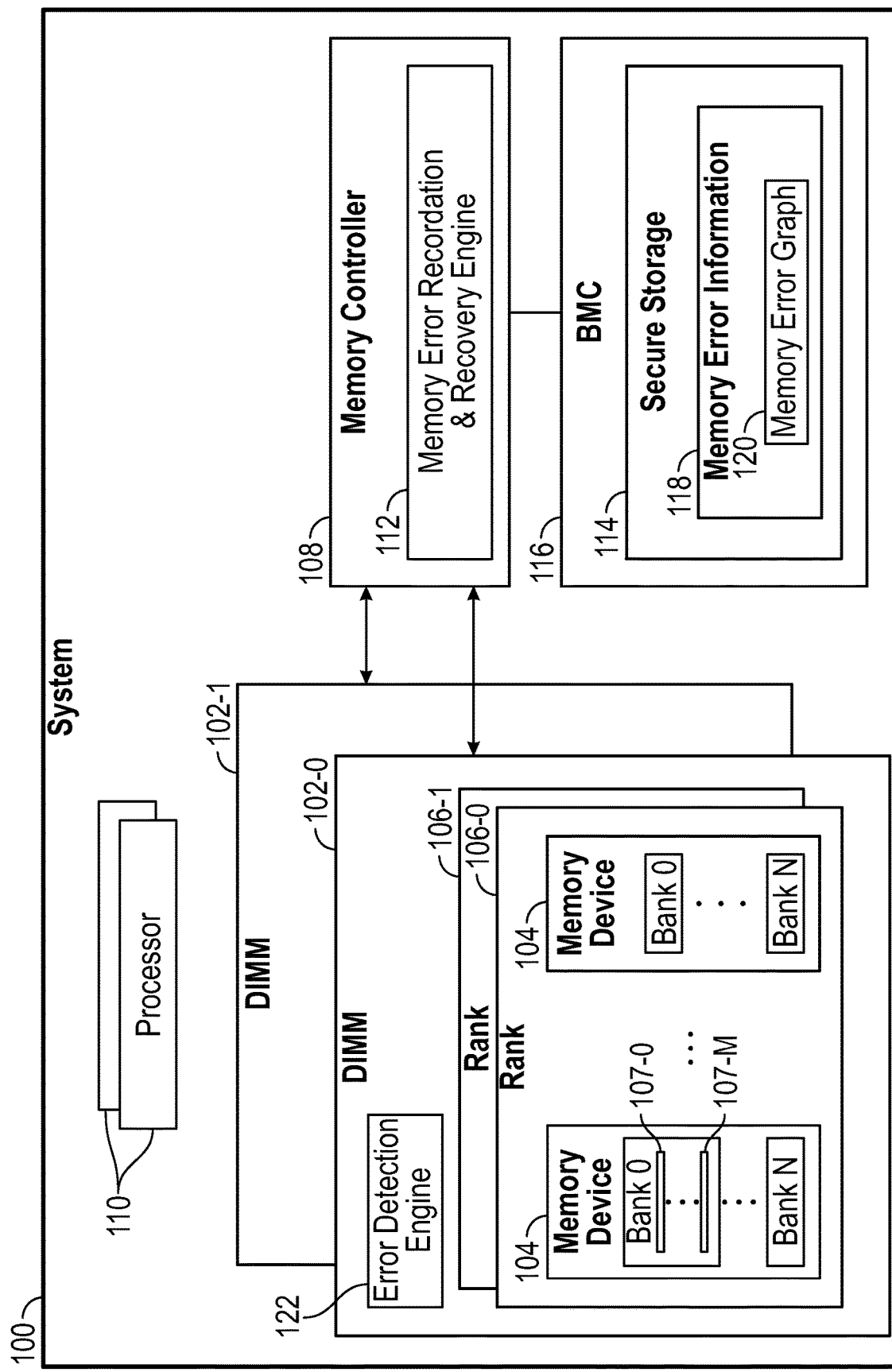
FIG. 1 is a block diagram of a system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, recovery actions performed to address memory errors in memory devices can include Reliability, Availability and Serviceability (RAS) operations. As examples, RAS operations can include post-package repair (PPR), memory resource sparing, and so forth.

PPR swaps a faulty row in a memory resource with a spare row in the same memory resource. A "memory resource" may include a memory device, a memory module with multiple memory devices (e.g., a dual in-line memory module (DIMM) or another type of multi-device memory module), a portion of a memory module such as a rank, a portion of a memory device such as a bank, and so forth.

Memory resource sparing swaps a faulty memory resource that contains memory errors with another memory resource. More generally, memory sparing can be applied in which a sparing memory resource is used in place of a failed memory resource. The sparing memory resource stores data in an address range corresponding to the failed memory resource. The sparing memory resource can include a sparing bank, a sparing memory device, a sparing rank, a sparing multi-device memory module such as a DIMM, and so forth.

Although specific examples of recovery actions from memory errors are noted above, in other examples, other types of recovery actions can be applied in response to detected memory errors.

If a computer system does not record errors exhibited by a memory system (which may include a single memory device or multiple memory devices), then upon restart of the computer system, the computer system would have no information about the memory errors in the memory system that occurred prior to the restart. The computer system is likely to encounter the same memory errors in the memory system at the same memory locations. This can result in a delay in recovery actions performed by the computer system to address the memory errors in the memory devices. The delay in recovery actions can lead to a degradation in the performance of the computer system. In some cases, the delay in recovery actions may result in uncorrectable errors in the memory system, which can cause a fault that prevents further operation of the computer system, or alternatively, can cause loss of data.

In accordance with some implementations of the present disclosure, when a computer system detects memory errors in a memory system (where the memory system can include a single memory device or multiple memory devices), information of the memory errors is recorded in a data structure stored in a non-volatile storage. The non-volatile storage can be implemented using a collection of non-volatile memory devices such as flash memory devices or other types of memory devices. A "collection" of non-volatile memory devices can include a single non-volatile memory device or multiple non-volatile memory devices. In other examples, the non-volatile storage can be implemented using disk-based storage device(s) or another type of storage device.

In some examples, the data structure that records memory errors can include a graph that has nodes (or equivalently, vertices) representing corresponding detected memory errors. As examples, the graph can be a directed acyclic graph (DAG), which is a directed graph with no cycles. A DAG includes nodes and edges between nodes.

The nodes that are connected by the edges in the DAG represent detected memory errors that occur over time. As certain new memory errors are detected, corresponding nodes can be added to the DAG.

In accordance with some implementations of the present disclosure, grouping of memory errors represented by nodes in the DAG can be performed. For example, two or more nodes of the DAG can be combined into a node that represents memory errors in a larger partition of the memory system than represented by the two or more nodes that have been grouped.

FIG. 1 is a block diagram of an example system 100, which can include a computer or multiple computers. The system 100 includes multiple DIMMs 102-0, 102-1, and so forth. In other examples, just a single DIMM can be employed. In further examples, instead of using a DIMM, a different type of memory module including multiple memory devices can be employed.

The DIMM 102-0 includes multiple memory devices 104. The multiple memory devices 104 of the DIMM 102-0 can be divided into multiple ranks 106-0, 106-1, and so forth. Each rank includes multiple memory devices 104.

Within each memory device 104, a number of banks are defined. For example, as shown in FIG. 1, each memory device 104 includes banks 0 to N, where N>1. Each bank of a memory device in turn includes multiple rows of memory cells. For example, bank 0 includes memory rows 107-0 to 107-M, where M>1.

A "memory cell" can refer to a storage element of a memory device that is used to store a single bit of data (or alternatively, multiple bits of data).

Although examples according to FIG. 1 show a memory system that includes DIMMs, where each DIMM has multiple ranks each with multiple memory devices, and where each memory device has multiple banks, in other examples, a memory system can have a different arrangement. For example, memory devices can be mounted onto a main circuit board of the system 100 rather than placed on a DIMM. As further examples, the DIMM is not divided into multiple ranks.

Data in the DIMMs can be accessed by a memory controller 108. In some examples, the memory controller 108 can be integrated into a processor, such as a processor 110. In other examples, the memory controller 108 can be separate from the processor 110. Although just one memory controller 108 is shown in FIG. 1, in other examples, more than one memory controller 108 may be present. For example, multiple processors 110 may include respective integrated memory controllers 108.

In accordance with some implementations of the present disclosure, the system 100 includes a memory error recordation and recovery engine 112. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In some examples, the memory error recordation and recovery engine 112 is included in the memory controller 108. In other examples, the memory error recordation and recovery engine 112 is separate from the memory controller 108. For example, the memory error recordation and recovery engine 112 can be implemented as part of firmware, an operating system (OS), or other machine-readable instructions in the system 100. In further examples, the memory error recordation and recovery engine 112 can be implemented with a first portion in the memory controller 108 and another portion in machine-readable instructions or other components outside of the memory controller 108.

The memory error recordation and recovery engine 112 is able to record, in a non-volatile storage, information of detected memory errors that occur in a memory system that includes the DIMMs 102-0, 102-1, and so forth. In some examples the non-volatile storage includes a secure storage 114 that is part of a baseboard management controller (BMC) 116. In other examples, the non-volatile storage is outside of the BMC 116

A "BMC" can refer to a specialized service controller (separate from a main processor such as the processors 110) that monitors the physical state of a computing node (e.g., one or more computing nodes in the system 100) using sensors and communicates with a remote management system (e.g., a cloud-based management system) (that is remote from the computing node) through an independent "out-of-band" connection. The BMC has management capabilities to manage components of the computing node. Examples of management capabilities of the BMC can include any or some combination of the following: power control to perform power management of the computing node (such as to transition the computing node between different power consumption states in response to detected events), thermal monitoring and control of the computing node (such as to monitor temperatures of the computing node and to control thermal management devices of the computing node), fan control of fans in the computing node, system health monitoring based on monitoring measurement data of various sensors of the computing node, remote access of the computing node (to access the computing node over a network, for example), remote reboot of the computing node (to trigger the computing node to reboot using a remote command), system setup and deployment of the computing node, system security to implement security procedures in the computing node, and so forth.

In some examples, the BMC can provide so-called "lights-out" functionality for the computing node. The lights out functionality may allow a user, such as a systems administrator, to perform management operations on the computing node even if an OS is not installed or not functional on the computing node.

Moreover, in some examples, the BMC can run on auxiliary power provided by an auxiliary power supply (e.g., a battery); as a result, the computing node does not have to be powered on to allow the BMC to perform the BMC's operations. The auxiliary power supply is separate from a main power supply that supplies powers to other components (e.g., the processors 110, the memory controller 108, the DIMMs 102-0, 102-1, etc.) of the computing node.

The secure storage 114 is protected against unauthorized access, such as by programs in the system 100 that may not be authorized to access the secure storage 114. Programs may have been compromised by malware, or the programs may be accessible by users who may not have authorization to access the secure storage 114.

The memory error recordation and recovery engine 112 records memory errors in memory error information 118 in the secure storage 114 of the BMC 116. For example, errors in memory cells and errors in memory rows can be recorded in the memory error information 118. As discussed further below, when memory errors satisfy certain criteria, nodes can be added to a memory error graph 120 to represent such memory errors, which can be memory row errors, memory bank errors, memory device errors, memory rank errors, memory module errors, and so forth.

If there are multiple memory controllers 108, then multiple respective instances of the memory error information 118 and the memory error graph 120 can be stored in the secure storage 114.

The memory error recordation and recovery engine 112 is able to access the memory error graph 120 in response to a restart of the system 100, to determine memory errors that have occurred in the system 100 prior to the restart. A "restart" of the system 100 can refer to a reboot of the system 100, a power cycle of the system 100 in which power is removed from the system 100 followed by re-application of power to the system 100, or any other event that involves the system 100 clearing stored information prior to resuming operation of the system 100. Based on the memory errors determined using the memory error graph 120, the memory error recordation and recovery engine 112 is able to apply recovery actions to recover from the memory errors, such as RAS operations.

Based on the recorded memory error information 118 including the memory error graph 120 stored in a non-volatile storage such as the secure storage 114 in the BMC 116, the memory error recordation and recovery engine 112 is able to "remember" memory errors that occurred prior to the restart and apply appropriate recovery actions in a more timely manner.

FIGS. 2-5 show examples of memory error graphs according to some implementations of the present disclosure. A memory error graph is created or updated in response to detected errors.

Figure 2:
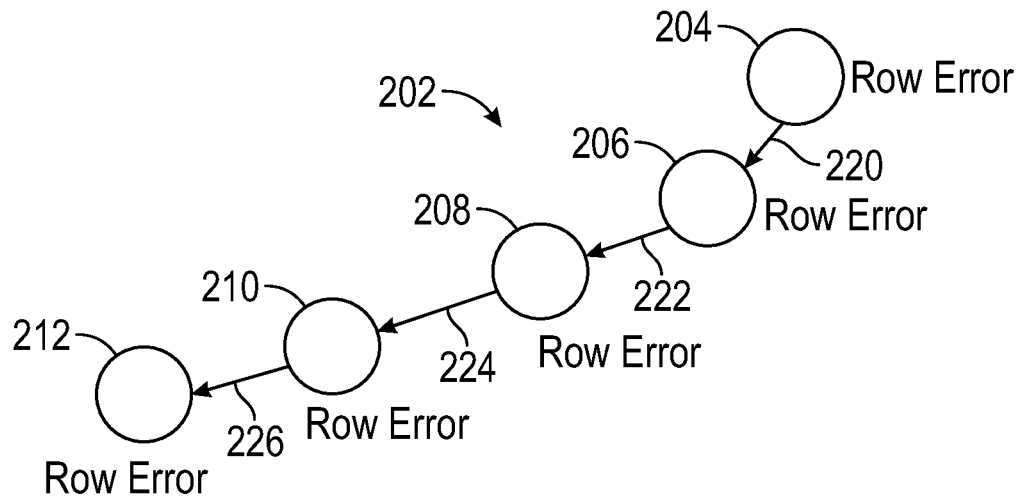
FIGS. 2-5 show graphs that represent memory errors, according to some examples.

FIG. 2 shows a number of nodes of a memory error graph 202 that represent respective memory row errors. More generally, each node of the memory error graph 202 represents a memory error event. However, in the example of FIG. 2, it is assumed that each node represents memory row errors—such a node is referred to as a "row error node" in the ensuing discussion.

Each row error node of the memory error graph 202 is created in response to detecting a number of memory row errors that exceeds a specified row error threshold. The row error threshold can be 1 or greater than 1. Thus, if the memory error recordation and recovery engine 112 detects that memory errors are present in a number of memory rows that exceeds the row error threshold, then the memory error recordation and recovery engine 112 updates the memory error graph 202 by adding a respective row error node to represent the detected number of memory row errors.

Assuming that the memory error graph 202 is initially empty, then in response to a detecting a first collection of memory row errors that exceeds the row error threshold, the memory error recordation and recovery engine 112 adds a row error node 204 to the memory error graph 202.

Subsequent row error nodes 206, 208, 210, and 212 are added to the memory error graph 202 in response to detecting respective subsequent collections of memory row errors that exceed the row error threshold.

Thus, the row error node 204 represents a first collection of memory row errors that exceed the row error threshold, the row error node 206 represents a second collection of memory row errors that exceeds the row error threshold, and so forth.

The row error node 204 represents the earliest occurrence of a collection of memory row errors that exceeds the row error threshold, while the node 212 represents the most recent occurrence of a collection of memory row errors that exceeds the row error threshold.

Each row error node can include any or some combination of the following pieces of information: an identifier of a row containing the row errors (e.g., a page address), an identifier of a memory device where the row errors are present, an identifier of a memory bank where the row errors are present, an identifier of a rank where the row errors are present, an identifier of a memory module (e.g., DIMM) where the row errors are present, and so forth.

A directed edge connects each node to a subsequent node. Thus, for example, a directed edge 220 connects the row error node 204 to the row error node 206, a directed edge 222 connects the row error node 206 to the row error node 208, a directed edge 224 connects the row error node 208 to the row error node 210, and a directed edge 226 connects the row error node 210 to the row error node 212. Each directed edge indicates that the second node in the pair of nodes connected by the directed edge follows (in time) the first node in the pair.

The following provides an example of how memory row errors can be detected and recorded by the memory error recordation and recovery engine 112.

The DIMM 102-0 of FIG. 1 includes an error detection engine 122. In some examples, the error detection engine 122 can use an error correction code (ECC) to detect correctable errors (e.g., a correctable 1-bit error, a correctable 2-bit error, and so forth), depending on the ECC used. In response to detecting a correctable error, the error detection engine 122 in the DIMM 102-0 can send a notification, such as to the memory error recordation and recovery engine 112, or alternatively, to a program (e.g., firmware, an OS, etc.) that executes in the system 100.

Note that the notification sent by the error detection engine 122 can identify the DIMM 102-0, include a memory address of a memory cell (or memory addresses of multiple memory cells) experiencing the error(s), and so forth. Based on the foregoing information, the memory error recordation and recovery engine 112 can make a determination of multiple errors occurring within a memory row. If greater than a threshold quantity of memory errors occur in the memory row, then that memory row can be indicated as being a memory row that has experienced an error. In response, the memory error recordation and recovery engine 112 can add information indicating the memory row error to the memory error information 118 in the secure storage 114 of the BMC 116. Note that if the row error threshold is greater than 1, the occurrence of a single memory row error would not trigger the addition of a new row error node to the memory error graph 202. In such an example, multiple memory row errors in a memory row would have to be detected to trigger the addition of a new row error node to the memory error graph 202.

Figure 3:
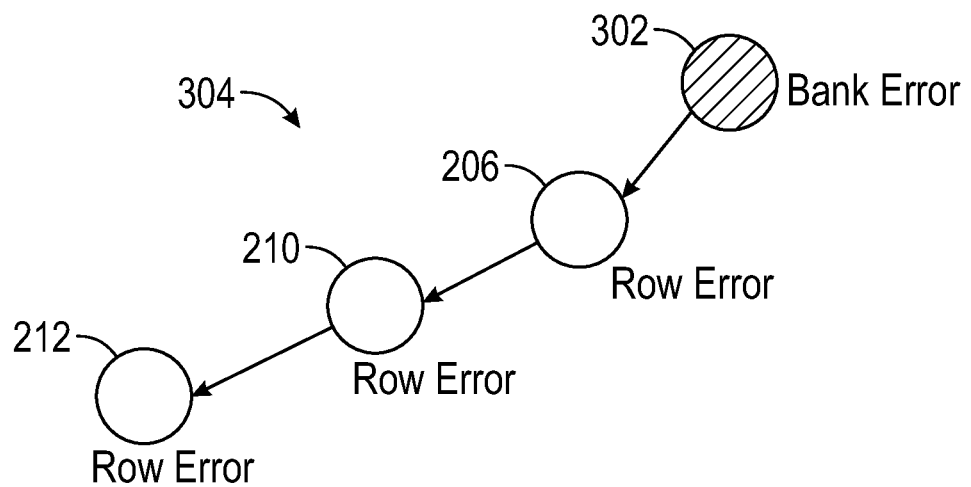

As row error nodes are added to the memory error graph 202 in response to detected memory row errors, the memory error recordation and recovery engine 112 may detect that some of the memory row errors are part of a larger partition of the memory system, such as a memory bank. As shown in FIG. 3, the memory error recordation and recovery engine 112 can combine two or more row error nodes (e.g., 204 and 208 in FIG. 2) of the memory error graph 202 into a combined node, referred to as a bank error node 302. The memory error recordation and recovery engine 112 combines the row error nodes 204 and 208 into the bank error node 302, if the memory error recordation and recovery engine 112 determines the number of memory row errors represented by the respective row error nodes 204 and 208 exceeds a bank error threshold. Stated differently, if the number of memory rows within the same bank experiencing errors exceeds the bank error threshold, then that indicates a faulty memory bank, and the row error nodes representing this number of memory rows are combined to form a bank error node.

Combining the row error nodes 204 and 208 into the bank error node 302 results in the generation of an updated memory error graph 304 as shown in FIG. 3. In the updated memory error graph 304, the row error nodes 204 and 208 have been deleted. In the updated memory error graph 304, the remaining row error nodes at 206, 210, and 212 remain unmodified.

The memory error recordation and recovery engine 112 can continue through the memory error graph 202 of FIG. 2 to identify other opportunities to combine row error nodes.

Figure 4:
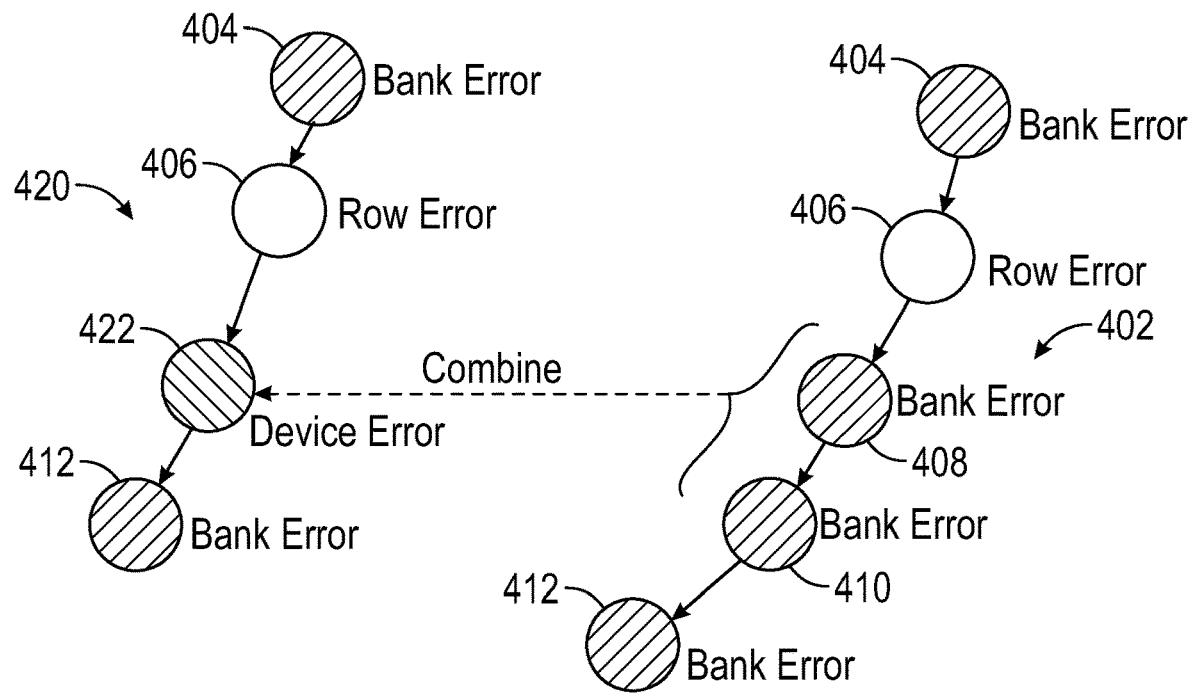

FIG. 4 shows an example in which bank error nodes are combined into a device error node. A memory error graph 402 includes a bank error node 404 representing a first collection of memory bank errors within a first memory bank, a row error node 406 representing row errors, a bank error node 408 representing a second collection of memory bank errors within a second memory bank, a bank error node 410 representing a third collection of memory bank errors within a third memory bank, and a bank error node 412 representing a fourth collection of memory bank errors within a fourth memory bank.

The memory error recordation and recovery engine 112 detects, based on information associated with the bank error nodes 408 and 410, that the bank error nodes 408 and 410 represent memory banks with errors that are part of the same memory device. In such examples, the bank error nodes 408 and 410 are combined into a device error node 422. An updated memory graph 420 is generated that includes the device error node 422 with the replaced bank error nodes 408 and 410 deleted.

The memory error recordation and recovery engine 112 can continue to process the memory error graph 402 to determine if other bank error nodes should be combined into a device error node.

The memory error recordation and recovery engine 112 can also combine device error nodes into a rank error node in cases where device error nodes represent memory errors in memory devices that are part of the same rank. Similarly, rank error nodes can be combined into a memory module error node if the ranks in which the memory device errors occur are part of the same memory module.

In some examples, the memory error recordation and recovery engine 112 may decommission a memory module, such as a DIMM. For example, a DIMM may be decommissioned if a number of memory devices or memory banks with errors in the DIMM exceeds a memory module threshold. Decommissioning a DIMM refers to removing the DIMM as a candidate for storing data such that the system 100 would no longer store data in the decommissioned DIMM.

Figure 5:
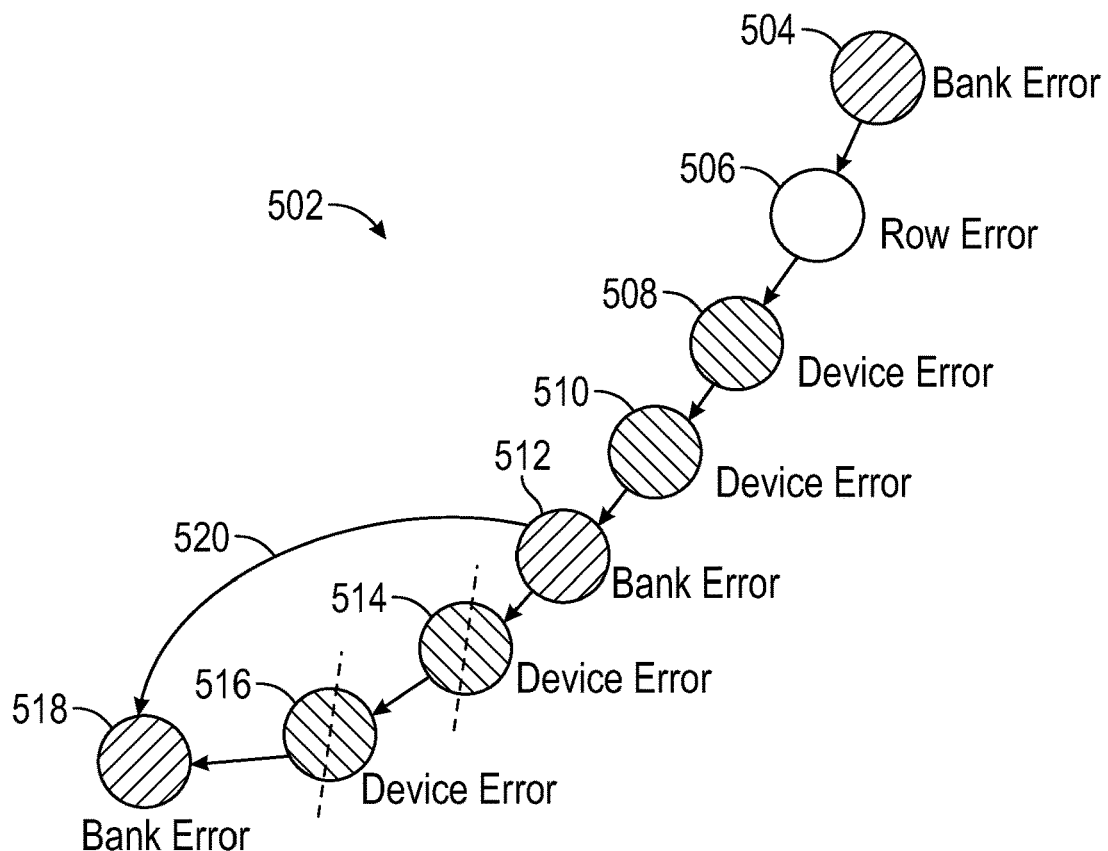

In response to decommissioning a DIMM, corresponding nodes in the DIMM are removed from a memory error graph. For example, FIG. 5 shows a memory error graph 502 with a number of memory error nodes, including a bank error code 504, a row error node 506, device error nodes 508 and 510, a bank error node 512, device error nodes 514 and 516, and a bank error node 518. If the memory error recordation and recovery engine 112 determines that the device error nodes 514 and 516 are part of a decommissioned DIMM, the memory error recordation and recovery engine 112 removes the device error nodes 514 and 516 from the memory error graph 502, and adds a new directed edge 520 from the bank error node 512 to the bank error node 518.

Figure 6:
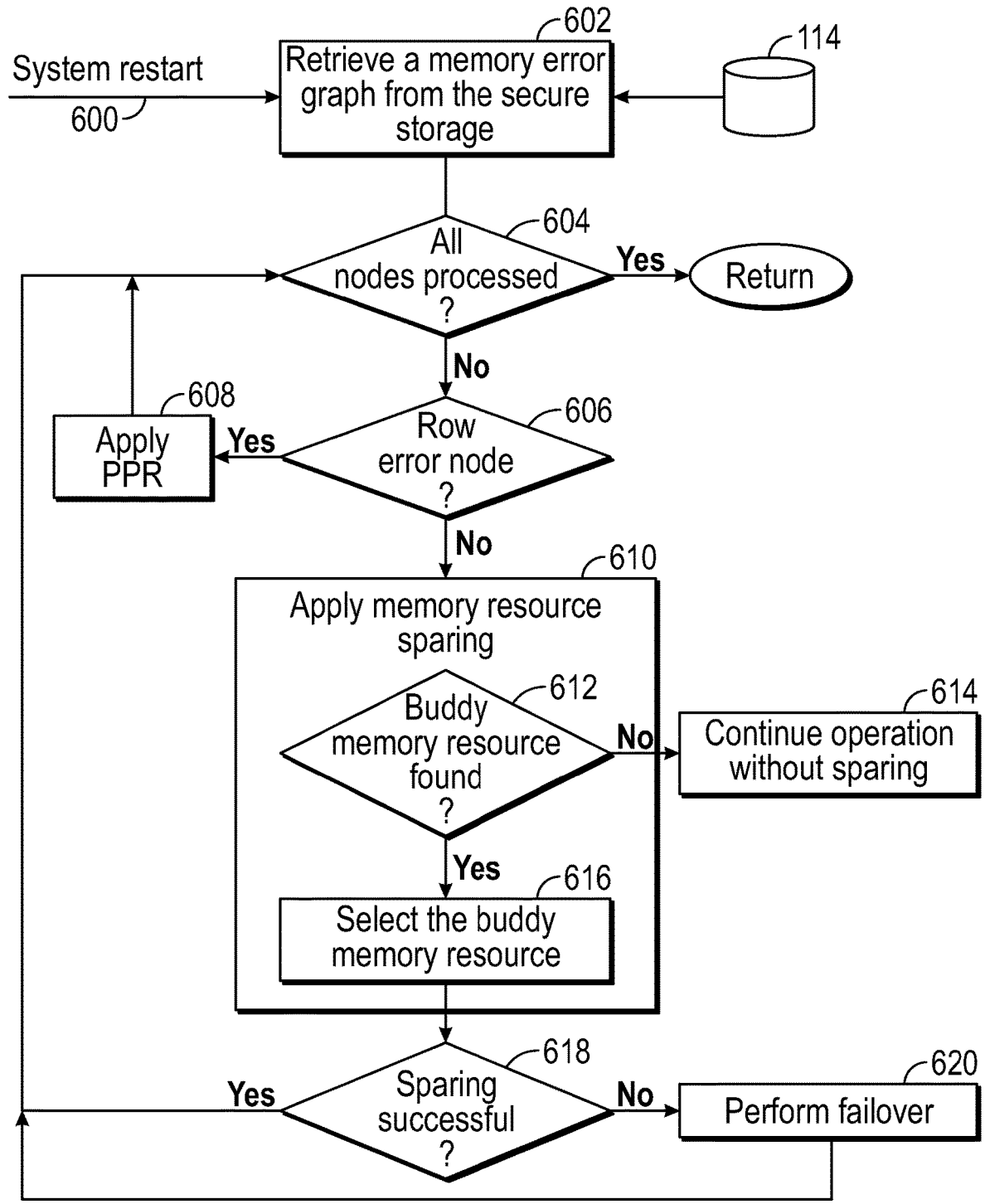
FIG. 6 is a flow diagram of a process according to some examples.

In response to a restart, the memory error recordation and recovery engine 112 can access the memory error graph 119 stored in the secure storage 114 of the BMC 116. FIG. 6 is a flow diagram of a process performed by the memory error recordation and recovery engine 112. In response to a system restart (600), the memory error recordation and recovery engine 112 retrieves (at 602) the memory error graph 120 from the secure storage 114 of the BMC 116.

The memory error recordation and recovery engine 112 determines (at 604) if all nodes of the memory error graph has been processed. If not, the memory error recordation and recovery engine 112 processes a current memory error node of the memory error graph, and determines (at 606) whether the current memory error node of the memory error graph is a row error node. If the current memory error node is a row error node, the memory error recordation and recovery engine 112 applies (at 608) PPR in which a faulty row is swapped with a spare row in the same memory bank.

If the memory error recordation and recovery engine 112 determines (at 606) that the current memory error node is not a row error node, the memory error recordation and recovery engine 112 applies (at 610) memory resource sparing. The memory resource sparing attempts to find a buddy memory resource for the erroneous memory resource represented by the current memory error node. An "erroneous" memory resource is a memory resource in which memory errors have been detected, as indicated by the current memory error node.

Note that the current memory error node may be a bank error node, a device error node, a rank error node, or a memory module error node. A "buddy" memory resource refers to a memory resource that can be used in addition to or in place of the erroneous memory resource, for the purpose of recovering from errors in the erroneous memory resource. For example, the buddy memory resource can be accessed in lockstep with the erroneous memory resource. "Lockstep" can refer to distributing error correction over multiple memory resources to compensate for hard errors in the erroneous memory resource. A lockstep partnership (that includes the erroneous memory resource and the buddy memory resource) refers to two memory resources over which error checking and correction is distributed or shared. The buddy memory resource can be a buddy bank, a buddy memory device, a buddy rank, or a buddy memory module (e.g., DIMM).

If a buddy memory resource is not found (as determined at 612), then no sparing is applied, and the memory error recordation and recovery engine 112 can continue operation (at 614) without performing sparing.

If a buddy memory resource is found (as determined at 612), the memory error recordation and recovery engine 112 selects (at 616) the buddy memory resource to use in memory sparing. The memory error recordation and recovery engine 112 selects a buddy memory resource such that the buddy memory resource does not fall in any memory resource identified as erroneous by the nodes of the memory error graph. For example, a buddy bank is selected such that the buddy bank does not fall in any memory device, memory rank, or memory module identified as erroneous by any node in the memory error graph. As another example, a buddy memory device is selected such that the buddy memory device does not fall in any memory rank or memory module identified as erroneous by any node in the memory error graph.

The memory error recordation and recovery engine 112 next determines (at 618) if the sparing was successful. If the sparing was successful, the process can return to task 604 to process the next memory error node in the memory error graph. However, if sparing was not successful, then a failover operation can be performed (at 620). Sparing would be unsuccessful if the memory error recordation and recovery engine 112 encounters an uncorrectable memory error while trying to move over the data to a spare memory resource. In some examples, the failover operation at 620 can include poisoning the spare memory resource, in which a specified signature is stored in the spare memory resource to identify the spare memory resource as bad or corrupted to warn a system when the specified signature is read. Reading the specified signature results in an uncorrectable memory error, which can result in a system crash.

At task 604, if the memory error recordation and recovery engine 112 determines that all memory error nodes of the memory error graph have been processed, then the memory error recordation and recovery engine 112 returns to allow the system restart to continue.

Figure 7:
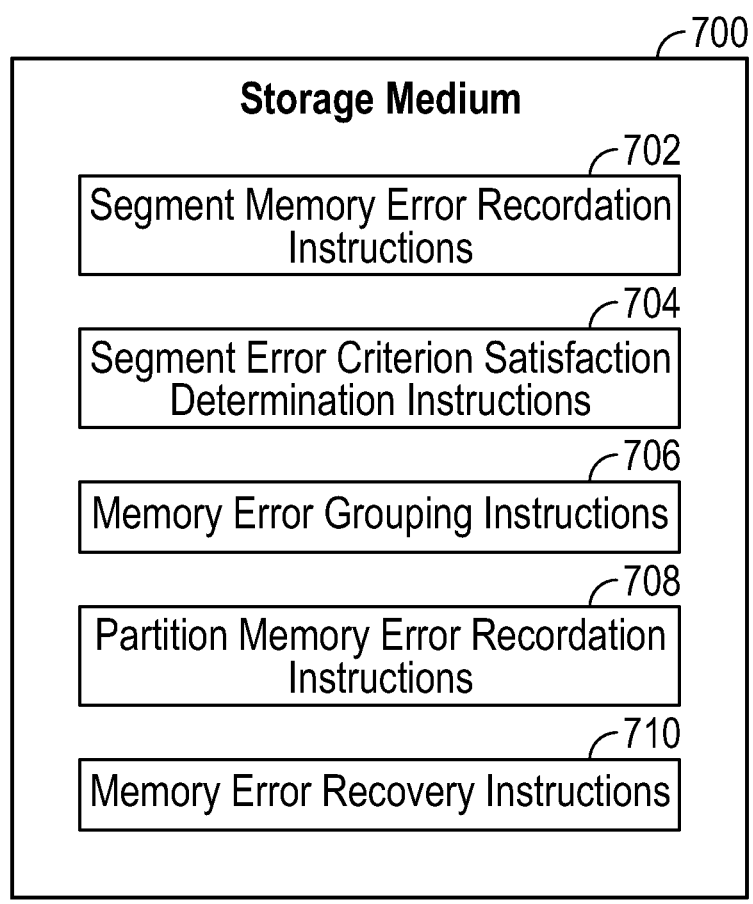
FIG. 7 is a block diagram of a storage medium storing machine-readable instructions, according to some examples.

FIG. 7 is a block diagram of a non-transitory machine-readable or computer-readable storage medium 700 storing machine-readable instructions that upon execution cause a system to perform various actions. The machine-readable instructions can be part of the memory error recordation and recovery engine 112 of FIG. 1, for example.

The machine-readable instructions include segment memory error recordation instructions 702 to record, in a data structure stored in a non-volatile storage (e.g., the memory error graph 120 stored in the secure storage 114 of the BMC 116 or a secure storage accessible by the BMC 116), information of memory errors in respective segments (e.g., rows, banks, etc.) of a memory (which can include memory devices and/or multi-device memory modules such as DIMMs).

In some examples, the data structure includes a graph including nodes representing memory errors in the segments, where grouping the memory errors of the subset into the partition includes combining two or more nodes of the graph.

The machine-readable instructions include segment error criterion satisfaction determination instructions 704 to determine whether memory errors of a subset of the segments satisfy a criterion (e.g., a quantity of memory errors in rows within the same memory bank exceeds a threshold).

The machine-readable instructions include memory error grouping instructions 706 to, in response to determining that the memory errors of the subset of the segments satisfy the criterion, group the memory errors of the subset into a partition (e.g., a memory bank, etc.) having a size greater than a size of a segment (e.g., a memory row, etc.).

The machine-readable instructions include partition memory error recordation instructions 708 to record, in the data structure, information of memory errors in the partition.

The machine-readable instructions include memory error recovery instructions 710 to, in response to a restart of the system, retrieve the data structure from the non-volatile storage for use in an operation that addresses memory errors in the system.

In some examples, the machine-readable instructions can determine whether a quantity of memory devices or memory banks in a memory module (e.g., a DIMM) exceeds a threshold, and in response to determining that the quantity of memory devices or memory banks in the memory module exceeds the threshold, decommission the memory module and remove information of the memory devices or memory banks in the decommissioned memory module from the data structure.

In some examples, after retrieving the data structure from the non-volatile storage, the machine-readable instructions can process entries of the data structure to determine a type of memory error and a recovery operation for the type of memory error.

In some examples, if the type of memory error is a row error, the recovery operation includes selecting a spare row and swapping a row with the row error with the spare row.

In some examples, if the type of memory error is an error in a memory resource (e.g., bank, memory device, rank, memory module, etc.) that is larger than a row, the recovery operation includes selecting a buddy memory resource to use in conjunction with (e.g., in lockstep operation) or in place of (for failover of) the memory resource with the error.

In some examples, after retrieving the data structure from the non-volatile storage, the machine-readable instructions can process entries of the data structure to determine a failed memory resource with an error and to select a buddy memory resource to address the error in the failed memory resource.

In some examples, the machine-readable instructions can determine further memory resources identified by the data structure as containing errors, and select the buddy memory resource that is not part of any of the further memory resources.

Figure 8:
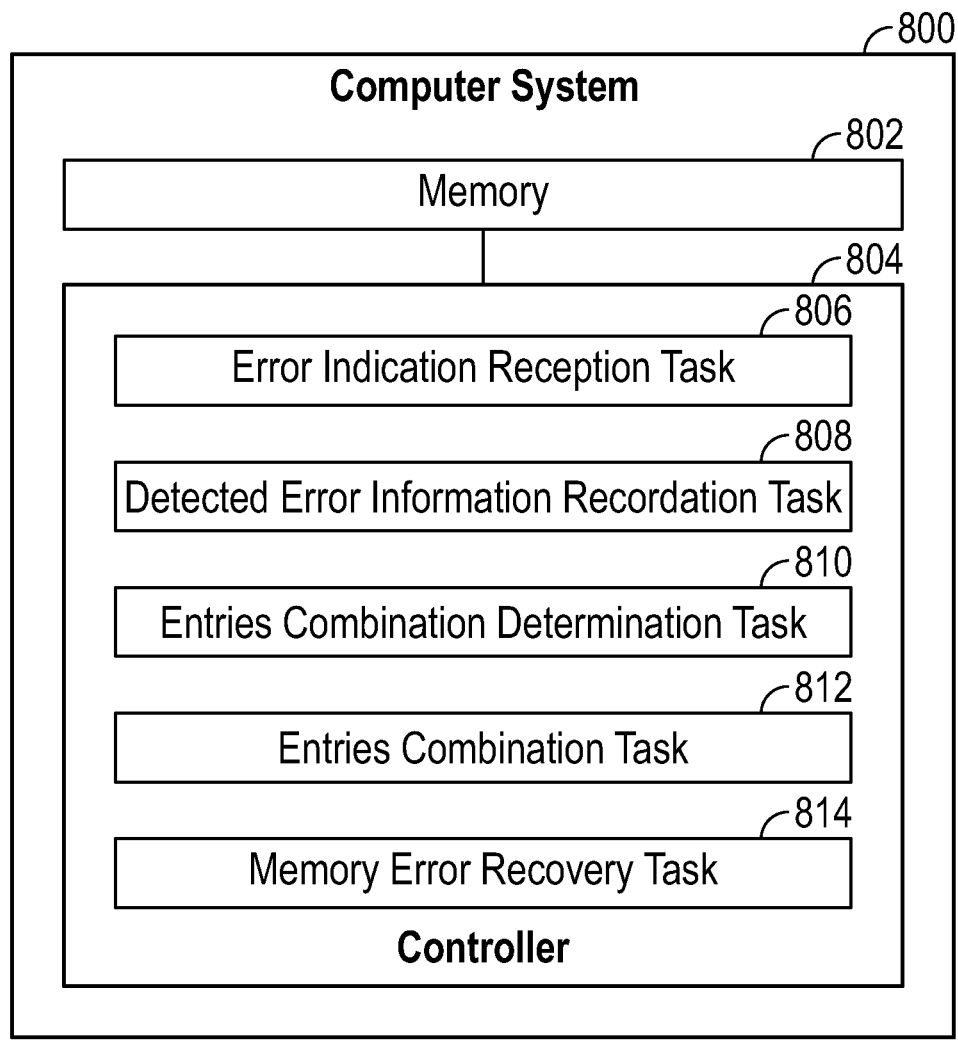
FIG. 8 is a block diagram of a system according to some examples.

FIG. 8 is a block diagram of a computer system 800 that includes a memory 802 (including the memory resources shown in FIG. 1, for example), and a controller 804 to perform various tasks. The controller 804 can include the memory controller 108 of FIG. 1, or any other controller in the computer system 800.

The tasks of the controller 804 include an error indication reception task 806 to receive indications of detected errors in the memory 802, such as from an error detection engine (e.g., 122) in a memory module or a memory device.

The tasks of the controller 804 include a detected error information recordation task 808 to record information of the detected errors in a data structure stored in a non-volatile storage. In some examples, the data structure includes a graph with nodes representing respective memory errors.

The tasks of the controller 804 include an entries combination determination task 810 to determine, based on the information, whether entries of the data structure are to be combined based on identifying multiple errors occurring within a common resource. The common resource can be a common bank, memory device, rank, or memory module.

In some examples, the controller 804 is to combine the entries into the combined entry based on determining that a threshold number of memory rows with errors are present in a same memory bank.

In some examples, the controller 804 is to combine the entries into the combined entry based on determining that a threshold number of memory banks with errors are present in a same memory device.

The tasks of the controller 804 include an entries combination task 812 to combine the entries into a combined entry based on the determination.

The tasks of the controller 804 include a memory error recovery task 814 to, in response to a restart of the computer system, retrieve the data structure including the combined entry from the non-volatile storage for use in an operation that addresses errors in the memory.

Figure 9:
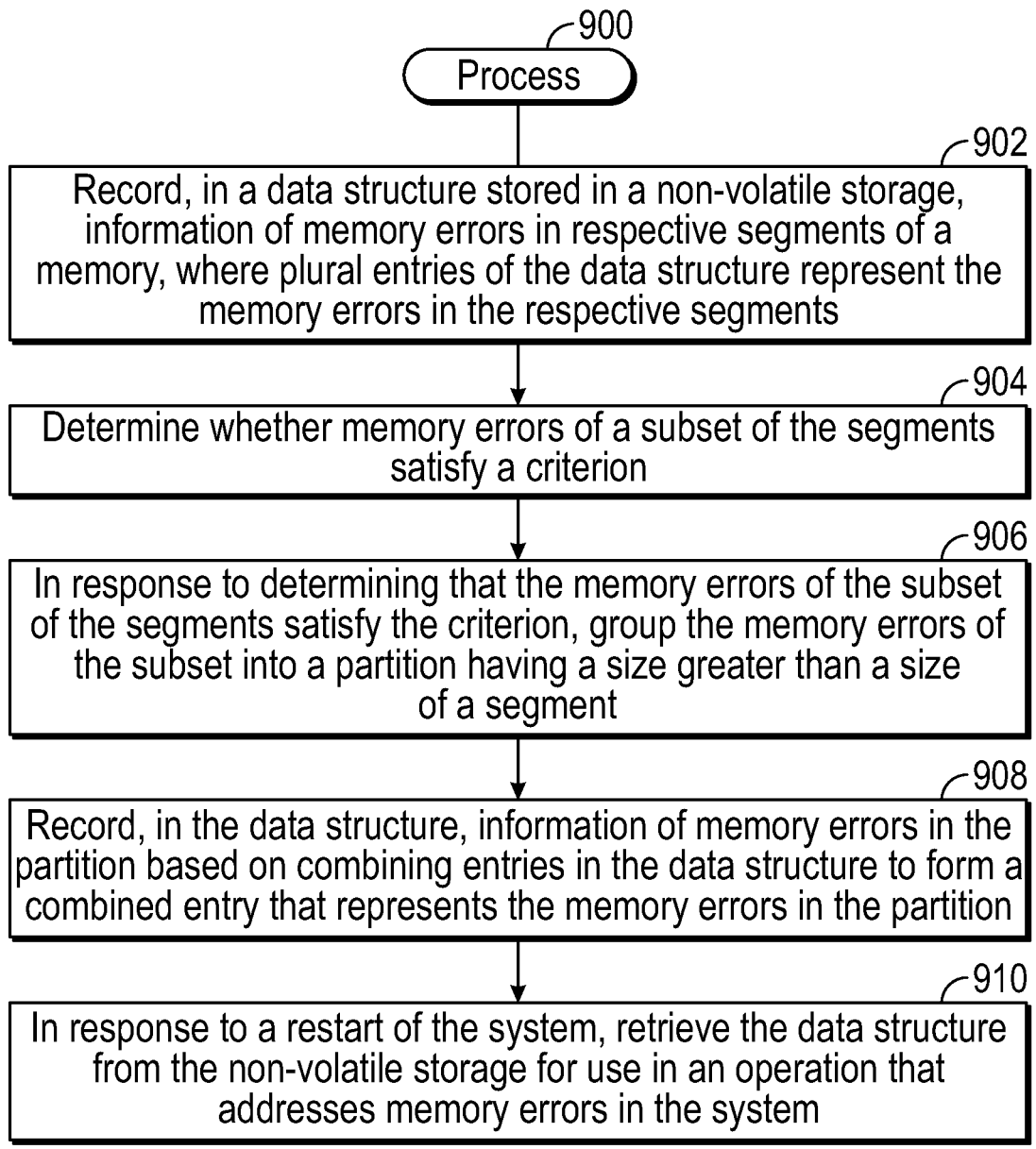
FIG. 9 is a flow diagram of a process according to further examples.

FIG. 9 is a flow diagram of a process 900, which can be performed by the memory error recordation and recovery engine 112 of FIG. 1, for example.

The process 900 includes recording (at 902), in a data structure stored in a non-volatile storage, information of memory errors in respective segments of a memory. Plural entries of the data structure represent the memory errors in the respective segments.

The process 900 includes determining (at 904) whether memory errors of a subset of the segments satisfy a criterion.

The process 900 includes, in response to determining that the memory errors of the subset of the segments satisfy the criterion, grouping (at 906) the memory errors of the subset into a partition having a size greater than a size of a segment. For example, the segments include rows and the partition includes a memory bank, or the segments include memory banks and the partition includes a memory device, and so forth.

The process 900 includes recording (at 908), in the data structure, information of memory errors in the partition based on combining entries in the data structure to form a combined entry that represents the memory errors in the partition.

The process 900 includes, in response to a restart of the system, retrieving (at 910) the data structure from the non-volatile storage for use in an operation that addresses memory errors in the system.

A storage medium (e.g., 700 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   record, in a data structure stored in a non-volatile storage, information of memory errors in respective segments of a memory;
   determine whether memory errors of a subset of the segments satisfy a criterion;
   in response to determining that the memory errors of the subset of the segments satisfy the criterion, group the memory errors of the subset into a partition having a size greater than a size of a segment;
   record, in the data structure, information of memory errors in the partition; and
   in response to a restart of the system, retrieve the data structure from the non-volatile storage for use in an operation that addresses memory errors in the system.

2. The non-transitory machine-readable storage medium of claim 1, wherein the non-volatile storage is associated with a baseboard management controller (BMC).

3. The non-transitory machine-readable storage medium of claim 1, wherein the data structure comprises a graph including nodes representing memory errors in the segments, and wherein grouping the memory errors of the subset into the partition comprises combining two or more nodes of the graph.

4. The non-transitory machine-readable storage medium of claim 3, wherein recording the information of the memory errors in the respective segments comprises adding nodes to the graph.

5. The non-transitory machine-readable storage medium of claim 1, wherein the segments comprise rows of the memory, and the partition comprises a bank of the memory.

6. The non-transitory machine-readable storage medium of claim 1, wherein the segments comprise banks of the memory, and the partition comprises a memory device of the memory.

7. The non-transitory machine-readable storage medium of claim 1, wherein the memory errors of the subset of the segments satisfy the criterion if a quantity of the memory errors in segments of the partition exceed a threshold.

8. The non-transitory machine-readable storage medium of claim 1, wherein the instructions upon execution cause the system to:
   determine whether a quantity of memory devices or memory banks in a memory module exceeds a threshold; and
   in response to determining that the quantity of memory devices or memory banks in the memory module exceeds the threshold, decommission the memory module and remove information of the memory devices or memory banks in the decommissioned memory module from the data structure.

9. The non-transitory machine-readable storage medium of claim 1, wherein the instructions upon execution cause the system to:
   after retrieving the data structure from the non-volatile storage, process entries of the data structure to determine a type of memory error and a recovery operation for the type of memory error.

10. The non-transitory machine-readable storage medium of claim 9, wherein if the type of memory error is a row error, the recovery operation comprises selecting a spare row and swapping a row with the row error with the spare row.

11. The non-transitory machine-readable storage medium of claim 10, wherein if the type of memory error is an error in a memory resource that is larger than a row, the recovery operation comprises selecting a buddy memory resource to use in conjunction with or in place of the memory resource with the error.

12. The non-transitory machine-readable storage medium of claim 9, wherein processing the entries of the data structure comprises processing nodes of a graph.

13. The non-transitory machine-readable storage medium of claim 1, wherein the instructions upon execution cause the system to:
   after retrieving the data structure from the non-volatile storage, process entries of the data structure to determine a failed memory resource with an error and to select a buddy memory resource to address the error in the failed memory resource.

14. The non-transitory machine-readable storage medium of claim 13, wherein the instructions upon execution cause the system to:
   determine, based on the data structure, further memory resources identified as containing errors; and
   select the buddy memory resource that is not part of any of the further memory resources.

15. A computer system comprising:
   a memory; and
   a controller to:
      receive indications of detected errors in the memory;
      record information of the detected errors in a data structure stored in a non-volatile storage;
      determine, based on the information, whether entries of the data structure are to be combined based on identifying multiple errors occurring within a common resource;
      combine the entries into a combined entry based on the determination; and in response to a restart of the computer system, retrieve the data structure including the combined entry from the non-volatile storage for use in an operation that addresses errors in the memory.

16. The computer system of claim 15, wherein the controller is to combine the entries into the combined entry based on determining that a threshold number of memory rows with errors are present in a same memory bank.

17. The computer system of claim 15, wherein the controller is to combine the entries into the combined entry based on determining that a threshold number of memory banks with errors are present in a same memory device.

18. The computer system of claim 15, wherein the data structure comprises a graph with nodes representing respective memory errors, and wherein combining the entries into the combined entry comprises combining multiple nodes into a combined node.

19. A method of a controller in a system, comprising:

recording, in a data structure stored in a non-volatile storage, information of memory errors in respective segments of a memory, wherein plural entries of the data structure represent the memory errors in the respective segments;

determining whether memory errors of a subset of the segments satisfy a criterion;

in response to determining that the memory errors of the subset of the segments satisfy the criterion, grouping the memory errors of the subset into a partition having a size greater than a size of a segment;

recording, in the data structure, information of memory errors in the partition based on combining entries in the data structure to form a combined entry that represents the memory errors in the partition; and in response to a restart of the system, retrieving the data structure from the non-volatile storage for use in an operation that addresses memory errors in the system.

20. The method of claim 19, further comprising:

after retrieving the data structure from the non-volatile storage, processing entries of the data structure in sequence to determine recovery operation to apply to address the memory errors in the system.

* * * * *